US00RE34174E

United States Patent [19]

Brown et al.

[11] E Patent Number: Re. 34,174

[45] Reissued Date of Patent: Feb. 9, 1993

[54] ICE MAKER WITH THERMAL PROTECTION

[75] Inventors: Ralph W. Brown, Orleans; Sammie C. Beach, Gowen; Gary R. Peter, Rockford, all of Mich.

[73] Assignee: White Consolidated Industries, Inc., Cleveland, Ohio

[21] Appl. No.: 748,791

[22] Filed: Aug. 22, 1991

Related U.S. Patent Documents

Reissue of:

[64] Patent No.: 5,010,738
Issued: Apr. 30, 1991
Appl. No.: 498,204
Filed: Mar. 23, 1990

[51] Int. Cl.[5] ..... F25C 1/24

[52] U.S. Cl. ..... 62/135; 62/300; 62/351

[58] Field of Search ..... 62/73, 135, 300, 351; 236/DIG. 6; 248/222.4

[56] References Cited

U.S. PATENT DOCUMENTS

| | | | |
|---|---|---|---|
| 926,194 | 6/1909 | Junkers | 236/DIG. 6 |
| 1,391,471 | 9/1921 | Gomez | 248/222.4 |
| 3,144,078 | 8/1964 | Morton et al. | 62/351 |
| 3,163,018 | 12/1964 | Shaw | 62/351 |
| 3,823,863 | 9/1974 | Boorman, Jr. | 62/300 X |
| 4,230,382 | 10/1980 | Wenzlick et al. | 312/330 R |
| 4,460,147 | 7/1984 | Macbain | 248/542 |
| 4,628,699 | 12/1986 | Mawby et al. | 62/137 |
| 4,741,169 | 5/1988 | Linstromberg | 62/135 |
| 4,754,615 | 7/1988 | Linstromberg | 62/300 |
| 4,756,165 | 7/1988 | Chestnut et al. | 62/351 |
| 4,833,894 | 5/1989 | Chesnut | 62/351 |

*Primary Examiner*—William E. Tapolcai
*Attorney, Agent, or Firm*—Pearne, Gordon, McCoy & Granger

[57] ABSTRACT

An ice maker for use in freezing compartments of refrigerators and freezers provides a thermal cut-out or fuse to prevent damage in the event of overtemperature conditions. The thermal fuse is located in a closed compartment where it cannot be accidentally damaged or moved. A leaf spring provides an end engaging the thermal fuse to reliably hold the thermal fuse in good heat exchange relationship with the mold in which the ice cubes are formed. The ice maker also provides an improved mounting structure permitting support fasteners to be partially threaded into the wall of the freezer compartment before the ice maker is moved to its mounted position.

16 Claims, 3 Drawing Sheets

ICE MAKER WITH THERMAL PROTECTION

Matter enclosed in heavy brackets [ ] appears in the original patent but forms no part of this reissue specification; matter printed in italics indicates the additions made by reissue.

BACKGROUND OF THE INVENTION

This invention relates generally to ice makers for refrigerators, and more particularly to such ice makers which incorporate novel and improved thermal protection.

PRIOR ART

U.S. Pat. No. 4,833,894 describes an ice maker for use in refrigerators. Such ice maker provides an aluminum mold having a plurality of cavities in which water is frozen to form individual ice cubes. An electric resistance hearer is controlled by a thermostat and operates to temporarily heat the mold after the ice cubes are formed so that the bond between the ice cubes and the mold is released. This allows the cubes to be easily ejected from the mold.

Such ice maker is also described as providing a thermal cut-out or fuse which shuts the unit off in the event that the heater causes excessive mold temperatures. The thermal fuse of the ice maker is mounted in a power lead and is positioned to sense and respond to the too excessive mold temperature.

Excessive mold temperatures can occur, for example, if the thermostat fails to open and shut the heater off when the mold temperature is reached sufficient to cause the melting of the ice cube along the interface with the mold.

The thermal cut-out of such patent is in an exterior, relatively unprotected position and is releasably held in heat exchange relationship with the mold by a clip. The clip also is in contact with the heater itself so it provides a relatively direct heat exchange relationship between the heater and the thermal fuse.

If for any reason the thermal fuse is bumped and caused to move out of thermal contact with the mold, it can fail to sense an overtemperature condition and fail to properly function. Such U.S. Pat. No. 4,833,894 is incorporated herein in its entirety to indicate what is believed to be the most pertinent prior art.

SUMMARY OF THE INVENTION

The present invention provides a novel and improved control structure for automatic ice makers of the general type described in U.S. Letters Pat. No. 4,833,894. The ice makers provide a mold, usually aluminum, having cavities in which water is frozen to provide ice cubes. Such ice maker is intended to be installed in the freezing compartment of a refrigerator or freezer, and depends upon the temperature therein to cause the freezing of the ice cubes.

In order to permit easy ejection of the frozen ice cubes, a heater is provided to heat the mold. This melts the ice along the interface with the mold to eliminate the bond between the mold and the ice cubes. The frozen cubes are then ejected from the mold.

Automatic controls are provided so that the ice maker repeatedly and automatically operates through cycles during which a thermostat determines that the water contained within the cavities of the mold is frozen and initiates the operation of a heater to eliminate the bond between the ice cubes and the mold. The ice cubes are then ejected from the mold and water is then supplied to fill the cavities for subsequent freezing.

Here again, a thermostat is provided in the control system to control the timing of the heater operation and the commencement of the automated cycle of operation. When the thermostat senses a mold temperature indicating that the water is frozen, it closes to initiate heater operation and to initiate the operation of the motor which powers the ejection system. Thereafter, when the temperature of the mold is raised to a level above freezing to indicate that a bond is destroyed, the thermostat again opens and terminates the operation of the heater.

In order to prevent excessive mold temperatures in the event that the thermostat fails to open and terminate the operation of the heaters, the control system provides a thermal cut-out or fuse. In accordance with the present invention, the thermal fuse is positioned directly against the surface of the mold and is positioned so that it is insensitive to the temperature of the heaters. Further, the thermal fuse is mounted within an enclosure structure where it cannot be accidentally damaged or moved out of heat exchange relationship with the mold. Further, the mounting of the thermal fuse is such that the thermal fuse is resiliently held in positive heat exchange relationship with the mold for accurate and reliable operation.

Another aspect of this invention involves the mounting of the ice maker within a refrigerator in which fasteners can be initially inserted prior to the installation of the ice maker. This facilitates the easy mounting of the ice maker within the freezing compartment of a refrigerator cabinet.

With the present invention, a simple structure is provided to reliably prevent overtemperature conditions and to protect against damage resulting from malfunction of the automatic thermostat normally operable to control the cyclic operation of the ice maker. In addition, an improved mounting structure is provided for ease of installation and removal of the ice maker within the freezer compartment of a refrigerator or the like. These and other aspects of the invention are illustrated in the accompanying drawings and more fully described in the following specification.

BRIEF DESCRIPTION OF THE DRAWINGS

FIG. 4 is an enlarged, fragmentary cross section, taken along line 4—4 of FIG. 3a;

FIG. 5b is a cross section taken along line 5b—5b of FIG. 5a.

DETAILED DESCRIPTION OF THE DRAWINGS

Figure 1:
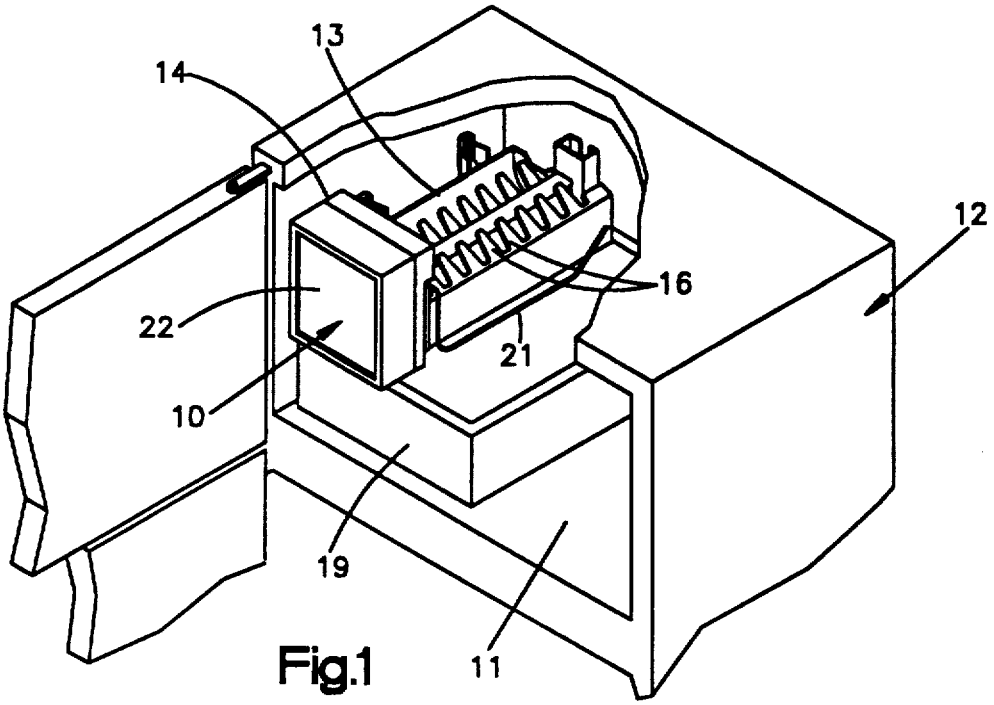
FIG. 1 is a fragmentary, perspective view of an ice maker in accordance with the present invention, installed in a typical refrigerator having an upper freezer compartment.

FIG. 1 illustrates a typical installation of an ice maker 10 incorporating the present invention in the freezer compartment 11 of a refrigerator 12. In such an installation, water is supplied to a mold 13 having a plurality of cavities in which the water is held while it freezes to form the ice cubes. An automatic control system is provided within a control housing assembly 14 mounted at one end of the mold 13. Along one side of the mold 13 is an array of stationary fingers 16. An array of ejector fingers is pivoted for rotation about an axis 15 and operate to eject ice cubes from the mold. The ejector fingers interleave with the stationary fingers and cooperate therewith to cause the ice cubes to be deposited in a bin 19 below the ice maker. The control system provides a motor connected to rotate the array of ejector fingers 17. A stop wire 21 is connected to the control system so that the automatic operation of the ice maker is terminated when sufficient ice cubes are located within the bin 19.

The ice maker thus far described is common to prior art ice makers and is familiar to those skilled in the art.

Figure 2:
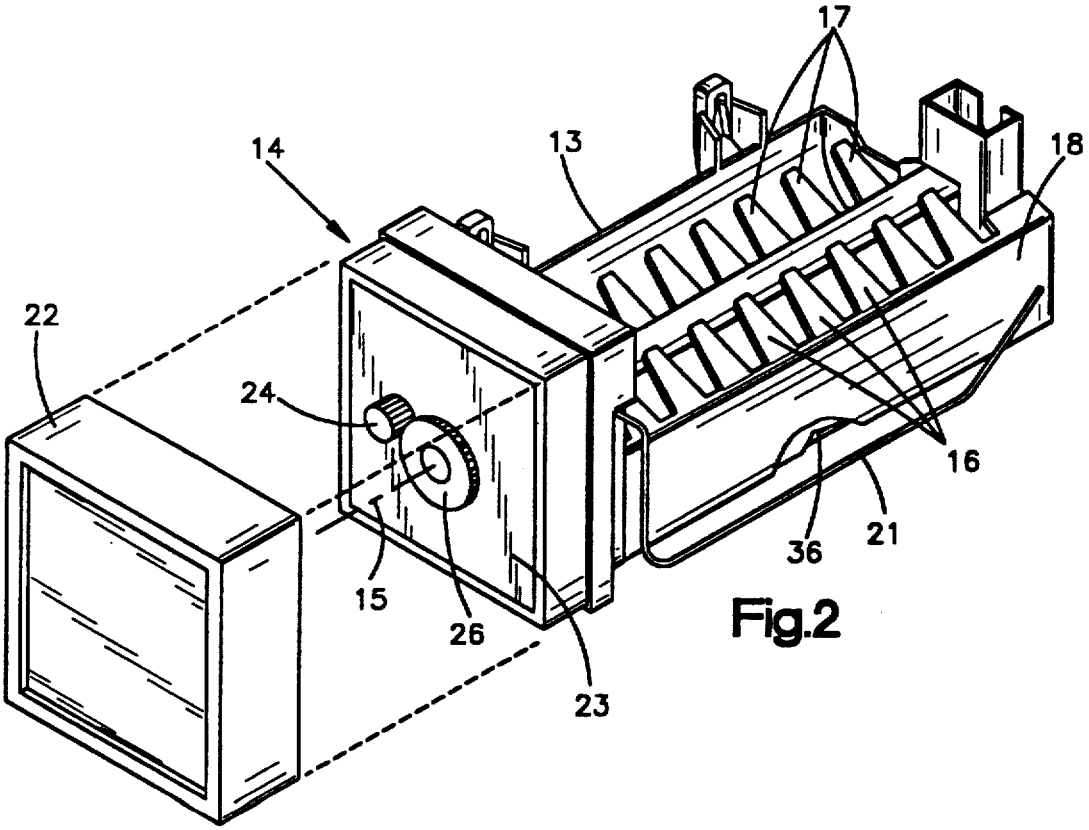
FIG. 2 is an enlarged, perspective view illustrating the ice maker per se with the cover removed from the control enclosure.
Figure 3:
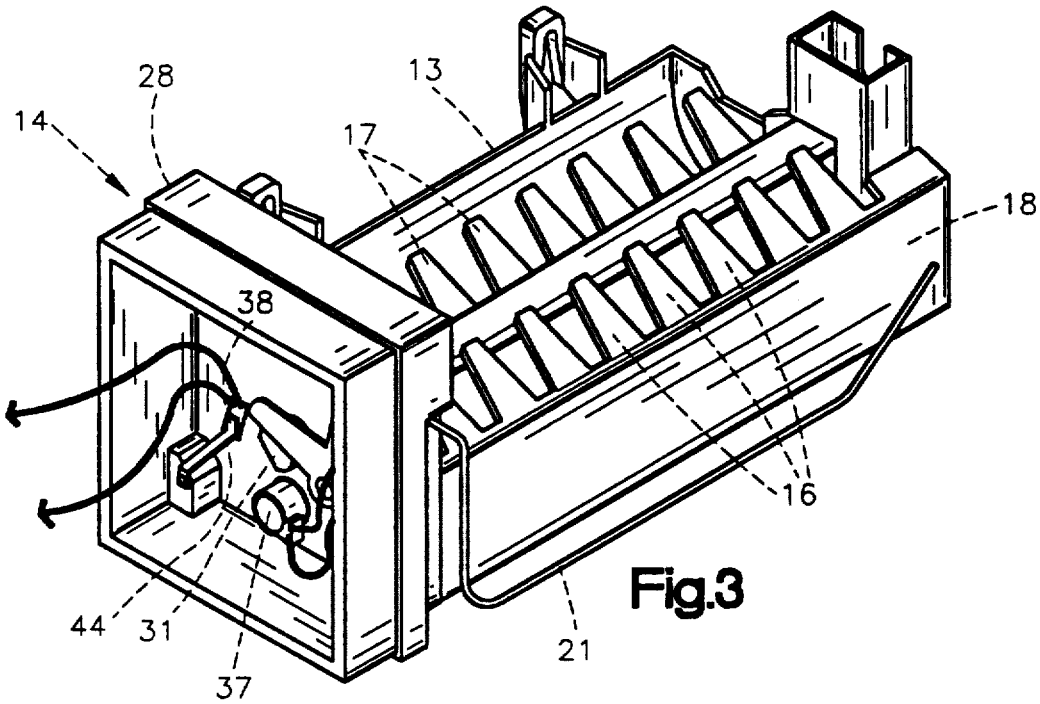
FIG. 3 is a perspective view similar to FIG. 2 but illustrating further disassembly of the control enclosure.
Figure 4:
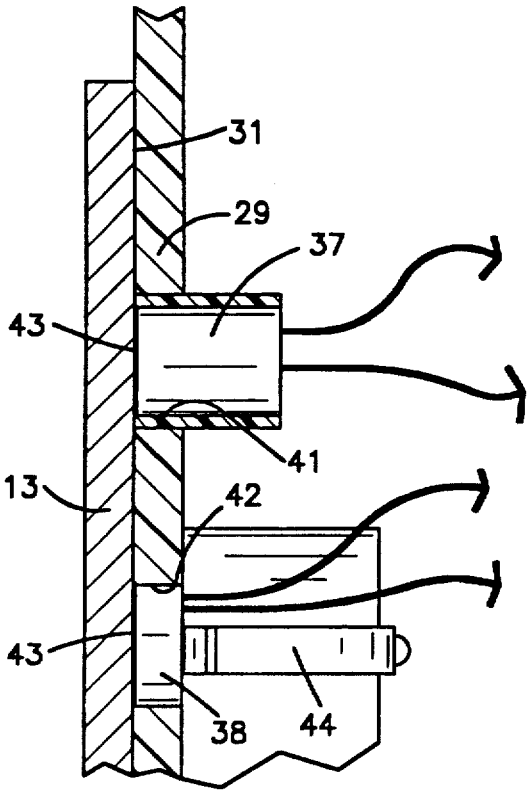

Referring now to FIGS. 2 through 4, the control housing assembly 14 includes a cover or cap member 22 which, when installed as illustrated in FIG. 1, completes the enclosure of the control system for the ice maker. However, in FIG. 2, the cover 22 is shown removed from the remainder of the control housing assembly. When the cover 22 is removed, a motor plate 23 is exposed. The electric motor (not illustrated) is mounted on the inner side of the motor plate 23 and provides an output gear 24 which meshes with and drives a gear 26 connected to rotate the ejector fingers about the axis 15.

Figure 3A:
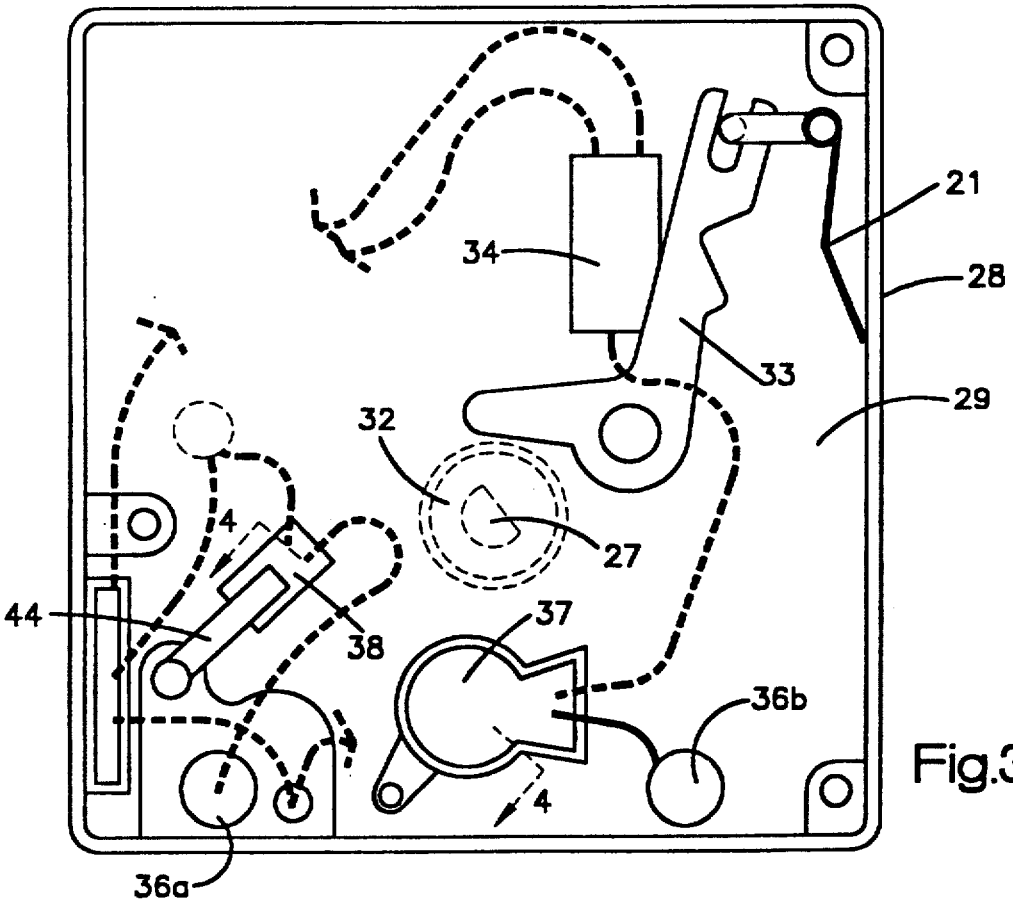
FIG. 3a is an enlarged view of the portion of the control circuit illustrated in FIG. 3 with the elimination of some of the elements thereof for purposes of simplifying the illustration of the present invention.

When the motor plate 23 is removed, the interior of the main housing member 28 is exposed to expose the electrical components of the automatic control system, as best illustrated in FIGS. 3, 3a and 4. In these figures, components of the control system which are not significant with respect to the present invention per se have been eliminated to make the drawings illustrating the invention easier to comprehend.

As best illustrated in FIG. 3a, the control system includes a number of components mounted on the non metallic inner wall 29 of the main housing member 28. The main housing member 28 is bolted to the end of the mold 13 so that the inner wall 29 of the housing member is in face-to-face abutment with the surface 31 of the end of the mold 13, as illustrated in FIG. 4. Projecting through the end wall of the mold and the inner wall 29 of the main housing member 28 is the end of the shaft 32 from which the ejector fingers 17 project. That shaft is connected to the gear 26 when the motor plate 23 is installed and is rotated around the axis 15 during a portion of the cycle of operation, as discussed below.

Also mounted on the inner wall is a pivoted lever 33 which is connected to one end of the stop wire 21. The lever operates a shut-off switch to prevent cycling of the ice maker when the bin 19 is full.

A U-shaped heater 36 has end terminals 36a and 36b which project through the inner wall 29 into the interior of the control housing assembly. The heater extends back along the mold along each bottom side edge thereof and across the mold at the end thereof remote from the control housing assembly 14. Such heater is positioned in good heat exchange relationship with the mold so as to heat the mold during a portion of the cycle of operation of the ice maker.

A pair of temperature sensors 37 and 38 are mounted in the inner wall 29 and respectively project through openings 41 and 42 formed therein so that they engage and are in direct heat exchange relationship with the end surface 31 of the mold, as best illustrated in FIG. 4. The sensor 37 is an automatic thermostat of the type which closes at a predetermined low temperature and opens at a predetermined higher temperature. The temperature sensor 38, on the other hand, is a thermal fuse or thermal cut-out device which remains closed during the normal operation of the system but opens and remains open when an excessive temperature occurs in the mold. The thermal fuse operates to prevent damage to the refrigerator and other components of the system in the event of a failure, for example, caused by failure of the thermostat 37 to open.

In order to ensure that the maximum thermal exchange relationship is maintained between the two temperature sensors 37 and 38 and the end surface 31 of the mold 13, a heat-conductive, greaselike material 43 is positioned between each of the temperature sensors and the surface 28 to ensure good intimate heat transfer characteristics. In FIG. 4, the thickness of such material 43 is exaggerated so that its presence can be illustrated.

The thermal cut-out 38 is held in the opening 42 and is resiliently biased toward the surface 31 by a leaf spring 44. One end of the spring is mounted on the housing and the other end engages the thermal fuse on the side thereof opposite the mold. The spring provides a resilient force reliably maintaining contact between the thermal fuse and mold even when thermal expansion and contraction occur. Consequently, the thermal fuse operates reliably to prevent overtemperature damage.

It is important to mount the thermal cut-out at an interior protected position where it cannot be accidentally damaged or moved from its heat exchange relationship. It is also important to mount the thermal cut-out in such a position that it does not sense the temperature of the heater per se in any way, and therefore is not subject to premature operation. If, for example, a heat exchange relationship between the heater and the thermal cut-out existed, premature operation of the thermal cut-out would likely occur since the heater inherently reaches a higher temperature than the mold even when the system is functioning properly.

Figure 5A:
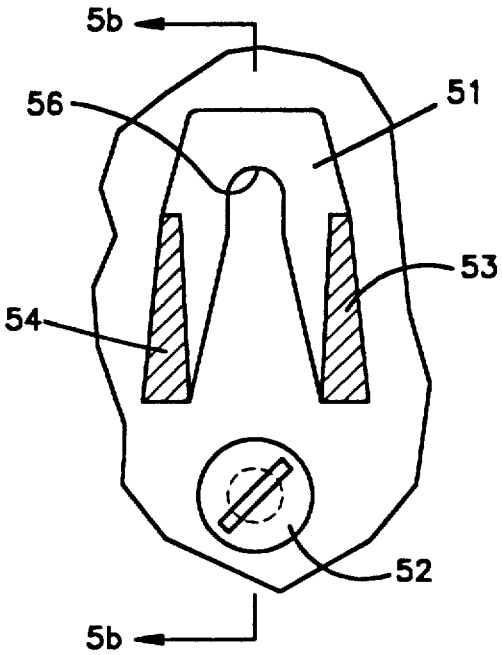
FIG. 5a is an enlarged fragmentary view illustrating the structure of an improved mounting system for the ice maker.
Figure 5B:
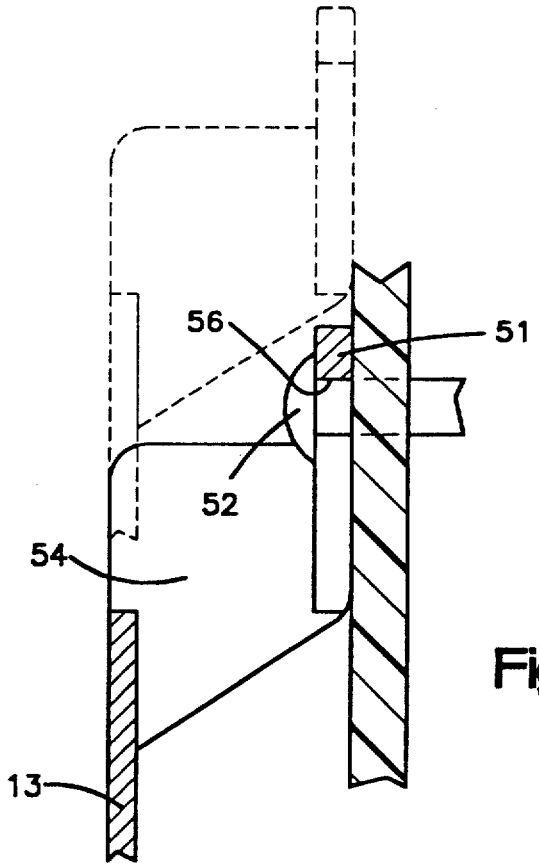

FIGS. 5a and 5b illustrate an improved mounting system for the ice maker which promotes ease of installation. In the past, it has been necessary to position the ice maker in its installed position and then install fasteners threaded into the wall of the refrigerator to complete the mounting. In accordance with this preferred mounting system, the fasteners are threaded part way into the wall. The ice maker is then positioned with its mounting legs 51 above the previously installed fasteners 52. The ice maker is then lowered so that the mounting legs move down along the sides of the shank of the fasteners 52 with the head cleared between two side walls 53 and 54. When the unit is lowered to a position into which the shanks of the fasteners engage the associated semicircular wall 56, the heads of the fasteners overlay the adjacent portions of the mounting legs and installation is completed by merely tightening the fasteners.

With the preferred embodiment of the present invention, the ice maker control circuit operates through repeated cycles starting when the water within the mold 13 is frozen. This is determined by the thermostat 37 sensing a mold temperature below freezing, preferably about 15 degrees Fahrenheit. When that occurs, the thermostat closes and simultaneously initiates the operation of the mold heater 36 and the motor (not illustrated). The initial rotation of the motor causes a cam on the gear 26 to close a hold switch. The gear reduction of the motor driving the ejection fingers is such that they do not move from the position illustrated in FIG. 3 past the stationary fingers 16 until a sufficient time has elapsed to allow the energized heater to melt the water at the interface between the ice cubes and the mold surface. After the bond between the ice cubes and the mold has released, the ejection fingers rotate down into the mold and around the eject the ice cubes out over the stationary fingers 16 and into the bin.

When the thermostat senses a mold temperature above the freezing temperature, ensuring that such bond has been released (preferably about 40 degrees Fahrenheit), the thermostat 37 again opens to terminate the operation of the mold heater 36. The motor continues to operate until it reaches the parking position of the ejector finger 17. A cam-operated hold switch opens to terminate the operation of the motor until the beginning of the next cycle. As is customary in these devices, a cam-operated water-fill switch is operated to fill the mold after the frozen ice cubes have been ejected therefrom so that a subsequent group of ice cubes can be formed.

With this invention, an ice maker is provided which is reliably protected against overtemperature conditions. The thermal cut-out or fuse 38 is located in a completely protected position where user contact cannot dislodge it from position. Further, it is spring-biased into reliable heat exchange relationship with the surface of the mold at a location substantially spaced from the heaters. Therefore, it reliably senses the temperature of the mold and is not affected by the higher temperatures of operation of the heaters which exist before the desired mold temperature is reached.

Preferably, the thermal cut-out is selected to operate at a temperature of at least about 170 degrees Fahrenheit, which is above the temperature likely to be encountered by the ice maker during storage and shipment of the unit prior to its installation and operation within the freezing compartment. This ensures that the thermal cut-out device will not be activated to its open condition prior to installation of the associated ice maker.

Although the preferred embodiment of this invention has been shown and described, it should be understood that various modifications and rearrangements of the parts may be resorted to without departing from the scope of the invention as disclosed and claimed herein.

What is claimed is:

1. An ice maker for refrigerators comprising a mold formed of thermally conductive metal, said mold having a cavity in which water is held and frozen when said mold is exposed to a subfreezing environment, heater means in heat exchange relationship with said mold, controls for said ice maker including a thermostat connected to activate said heater means when the water in said cavity freezes forming an ice cube, said heater means operating to melt ice along its interface with said cavity to release the bond between said ice and mold and permit removal of said ice cube from said cavity, said thermostat operating to terminate operation of said heater means when said mold reaches a first predetermined temperature at least high enough to melt said ice along said interface, said controls also including a thermal fuse positioned against said mold in direct heat exchange relationship therewith operating to terminate the operation of said heater means when the temperature of said mold reaches a second predetermined temperature substantially above said first predetermined temperature, and enclosure means enclosing the controls for said ice maker including said thermostat and thermal fuse along with portions of said mold in heat exchange relationship therewith to ensure that said heat exchange relationship between said mold and thermal fuse is maintained, said mold being elongated having an end, said enclosure means including a non-metallic inner wall having portions engaging said end or said mold, said inner wall having openings therein exposing portions of said end of said mold, said thermostat and said thermal fuse being positioned in said opening in direct heat exchange relationship with said end of said mold.

2. An ice maker as set forth in claim 1, wherein said controls include spring means resiliently biasing said thermal fuse into direct engagement with said mold.

3. An ice maker as set forth in claim 2, wherein sad thermal fuse engages said mold at a location substantially spaced from said heater means.

4. An ice maker as set forth in claim 1, wherein said thermal fuse engages said mold at a location spaced from said heater means to prevent a direct exchange relationship between said thermal fuse and said heater means.

5. An ice maker as set forth in claim 1, wherein said second predetermined temperature is higher than normal environmental temperatures of said ice maker to prevent premature operation of said thermal fuse.

6. An ice maker as set forth in claim 1, wherein said controls include an elongated leaf spring mounted at one end on said enclosure means and having its other end engaging the side of said thermal fuse opposite said mold, said leaf spring resiliently urging said thermal fuse toward said mold reliably maintaining heat exchange relationship therewith during thermal expansion and contraction of the components of said ice maker.

7. An ice maker as set forth in claim 1, wherein said mold provides mounting legs installable and removable on fasteners threaded into the wall of said refrigerator unit whereby said fasteners can be partially threaded into said wall before said ice maker is installed.

8. An ice maker comprising an aluminum mold having cavities in which water is frozen to form ice cubes, a heater in heat exchange relationship with said mold operable to heat said mold and melt said ice cubes along the interface therewith to allow removal of said ice cubes from said mold, a non-metallic control housing having an inner wall in abutting relation with a portion of said mold and defining a closed chamber, said inner wall having openings therein exposing surface portions of said aluminum mold to said chamber, controls in said chamber including a first control positioned in an opening in said inner wall operable to energize said heater when ice cubes are frozen in said cavities and to subsequently de-energize said heater, and a thermal fuse in said chamber mounted in an opening in said inner wall abutting an adjacent surface of said mold and operating to de-energize said heater when excessive temperatures occur.

9. An ice maker as set forth in claim 8, wherein a spring mounted in said cavity provides an end engaging said thermal fuse on the side thereof opposite said mold resiliently urging said thermal fuse into direct heat exchange relationship with said mold.

10. An ice making system comprising a refrigerator having a compartment maintained at sub-freezing temperatures, an ice maker mounted in said compartment, said ice maker including an aluminum mold having cavities in which water is frozen to form ice cubes, a heater in heat exchange relationship with said mold operable to heat said mold and meld said ice cubes along the interface thereof with said cavities to allow removal of said ice cubes from said mold, a control housing having an inner wall in abutting relationship with a portion of said mold and defining a closed chamber, controls in said chamber including a first control operable to energize said heater when said ice cubes are frozen in said cavities and to thereafter de-energize said heater, and a thermal fuse mounted in said inner wall abuting an adjacent surface of said mold, said thermal fuse operating to de-energize said heater when excessive mold temperatures occur, said inner wall being non-metallic and having openings therein exposing portions of said mold, said first control and said thermal fuse being positioned in said openings in direct heat exchange relationship with said mold.

*11. An ice maker for mounting in the freezer compartment of refrigerators comprising an elongated mold formed of thermally conductive material, said mold having a cavity in which water is held and frozen when exposed to subfreezing environment, a heater in heat exchange relationship to said mold operable to melt ice along its interface with said cavity to release the bond therebetween and allow removal of the ice from said cavity, power means connected to eject said ice from said cavity when said heater releases said bond between said cavity and said ice, said mold providing laterally extending mounting legs at spaced locations along the length of said mold for mounting said ice maker on the wall of said freezer compartment, each of said mounting legs providing a face portion having a slot therein open at one end, said face portion being spaced from the adjacent side of said mold and connected to said adjacent side by a pair of substantially parallel wall portions extending between said face portion and said adjacent edges of said mold with one wall portion located on each side of the associated slot, said ice maker being installable on headed fasteners threaded partially into said wall of said freezer compartment by positioning said face portion against said wall and moving said legs along said wall causing said fasteners to move through the associated opening into the associated slot, said fastener heads passing between the adjacent wall portions.*

*12. An ice maker as set forth in claim 11, wherein said heads are accessible after said mold is mounted on said fasteners permitting tightening and loosening of said fasteners.*

*13. An ice maker as set forth in claim 11, wherein said slots provide opposed side walls which diverge as they extend toward said openings.*

*14. An ice maker as set forth in claim 12, wherein said ice maker is adaptably mounted on a vertical side wall of a freezer compartment of a refrigerator and wherein said face portions extend vertically, said slots being open at the bottom end thereof, and said ice maker is installed by moving said face portion down along said side wall causing said fasteners to pass through said openings into the associated slot, said fasteners being accessible over the top of said mold when said ice maker is installed.*

*15. An ice maker as set forth in claim 11, wherein said ice maker provides a housing at one end of said mold enclosing said power means, said housing tending to block access to said fasteners when said ice maker is installed.*

*16. A refrigerator providing a freezer compartment having a vertically extending side wall, an ice maker mounted in said freezer compartment against said side wall, said ice maker providing a mold having a cavity in which water is held and frozen when exposed to a subfreezing environment within said freezing compartment, a heater in heat exchange relationship to said mold operable to melt ice along its interface with said cavity to release the bond therebetween and allow removal of ice from said cavity, power means connected to eject said ice from said cavity when said heater releases said bond between said cavity and said ice, said mold providing laterally and upwardly extending legs at spaced locations along the length of said mold for mounting said ice maker on said side wall of said freezer compartment, each of said mounting legs providing a face portion having a slot therein open along the lower edge of said face portion, said face portion being spaced from the adjacent side of said mold and connected to said adjacent side of said mold by a pair of substantially parallel wall portions extending between said face portion and the adjacent edge of said mold with one wall portion located on each side of the associated slot, said ice maker being installable on fasteners threaded partially into said wall of said freezer compartment by positioning said face portion against said side wall and moving said legs downwardly along said wall causing said fasteners to move into said slots through said openings therein, said fasteners providing heads passing between the adjacent of said wall portions, said fasteners being accessible over the top of said mold when said ice maker is in said installed position.*

* * * * *